United States Patent
Craig

[11] 3,971,154
[45] July 27, 1976

[54] TROLLING PLANER

[76] Inventor: Henry A. Craig, 4130 S. Elm, Rapid City, S. Dak. 57701

[22] Filed: Oct. 3, 1975

[21] Appl. No.: 619,490

[52] U.S. Cl............................ 43/43.13; 43/42.23
[51] Int. Cl.².................................. A01K 95/00
[58] Field of Search........... 43/43.13, 42.23, 42.22, 43/42.49, 42.5

[56] References Cited
UNITED STATES PATENTS

| | | | |
|---|---|---|---|
| 2,062,718 | 12/1936 | Kallberg | 43/43.13 |
| 2,741,863 | 4/1956 | Magil | 43/43.13 |
| 3,863,382 | 2/1975 | Heili | 43/43.13 |

Primary Examiner—Warner H. Camp
Attorney, Agent, or Firm—Victor J. Evans & Co.

[57] ABSTRACT

A trolling planer having an adjustable means to control the depth at which a fish lure will be towed comprising threaded means to move the position of the towing line with respect to the planer.

5 Claims, 7 Drawing Figures

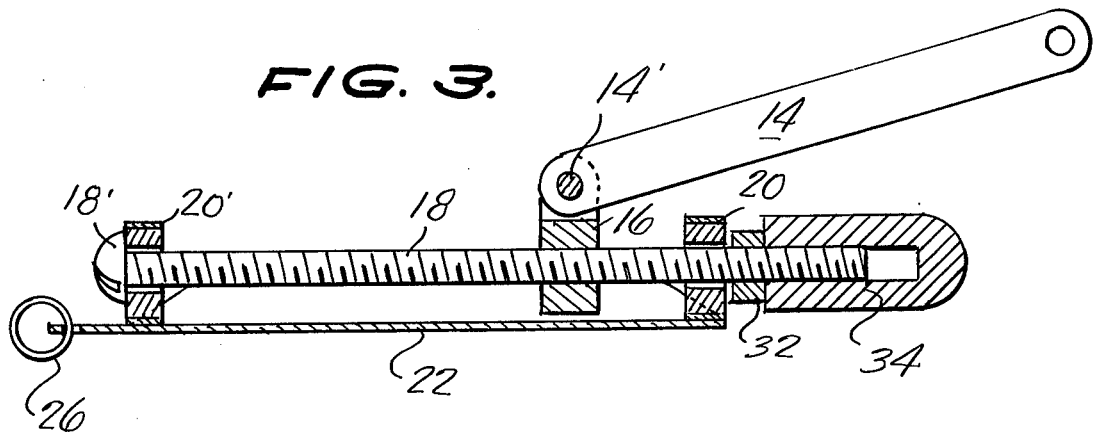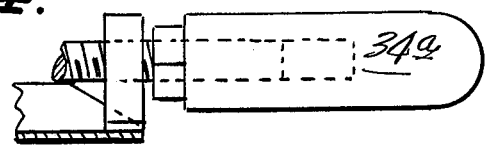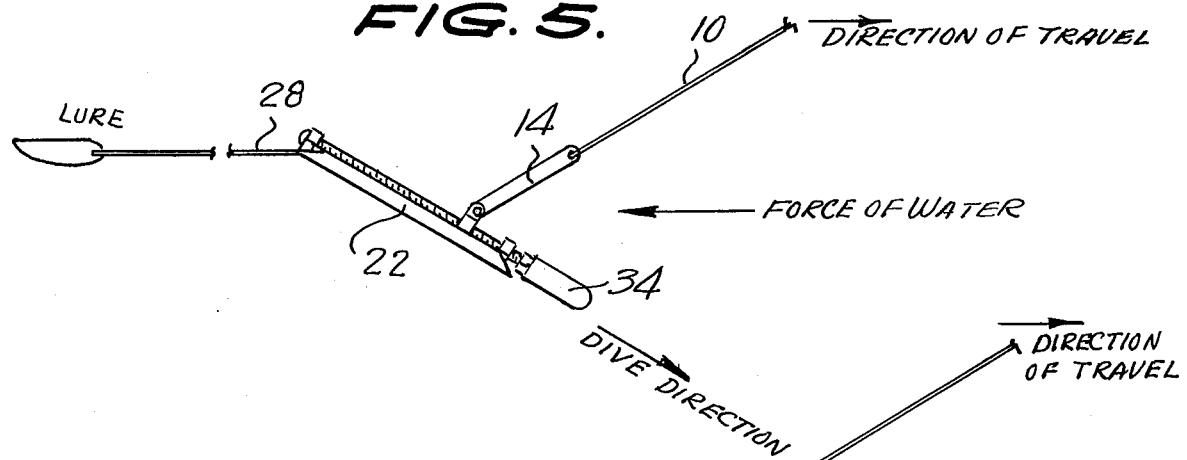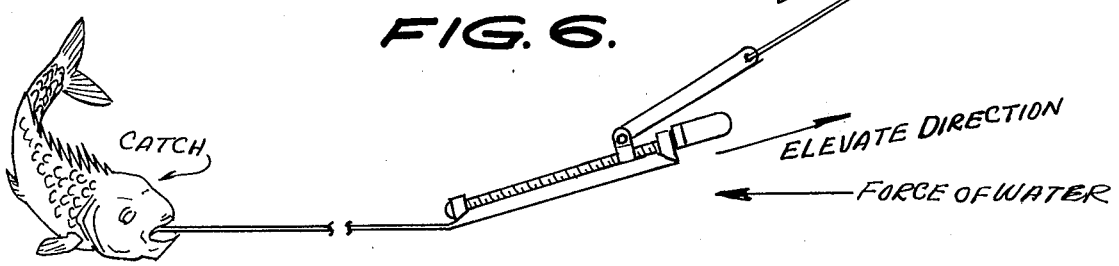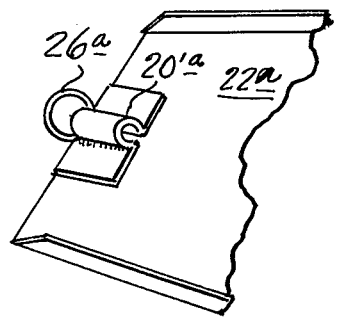

TROLLING PLANER

BACKGROUND OF THE INVENTION

Field of the Invention

In order to be able to troll for fish without using an excessively long fishing line, it is found that the proper depth at which the fishing lure, or bait should be towed may be attained by use of a planing device.

The difficulty has been that towing at different depths has required different planing devices for different depths. It is an object of the present invention to provide a single planing device for use in trolling which may be adjusted to make it suitable for use for trolling at different depths and for use with lures presenting different resistances to the towing force.

Other and further objects and advantages will appear from the following specification taken with the accompanying drawings in which like reference characters designate similar parts in the several views.

BRIEF DESCRIPTION OF THE DRAWINGS

FIG. 3 is a section on line 3—3 of FIG. 1;

FIG. 4 is an elevation of the forward part of the device showing a heavier weight than in FIG. 3;

FIG. 5 is an elevation indicating how the planing device pulls the lure down to trolling depth;

FIG. 6 is an elevation indicating how the catch, by resisting being pulled to the surface causes the planing device to help the fisherman; and FIG. 7 is a fragmentary view showing one variation of the connection from the device to the lure.

DESCRIPTION OF THE PREFERRED EMBODIMENT

Figure 1:
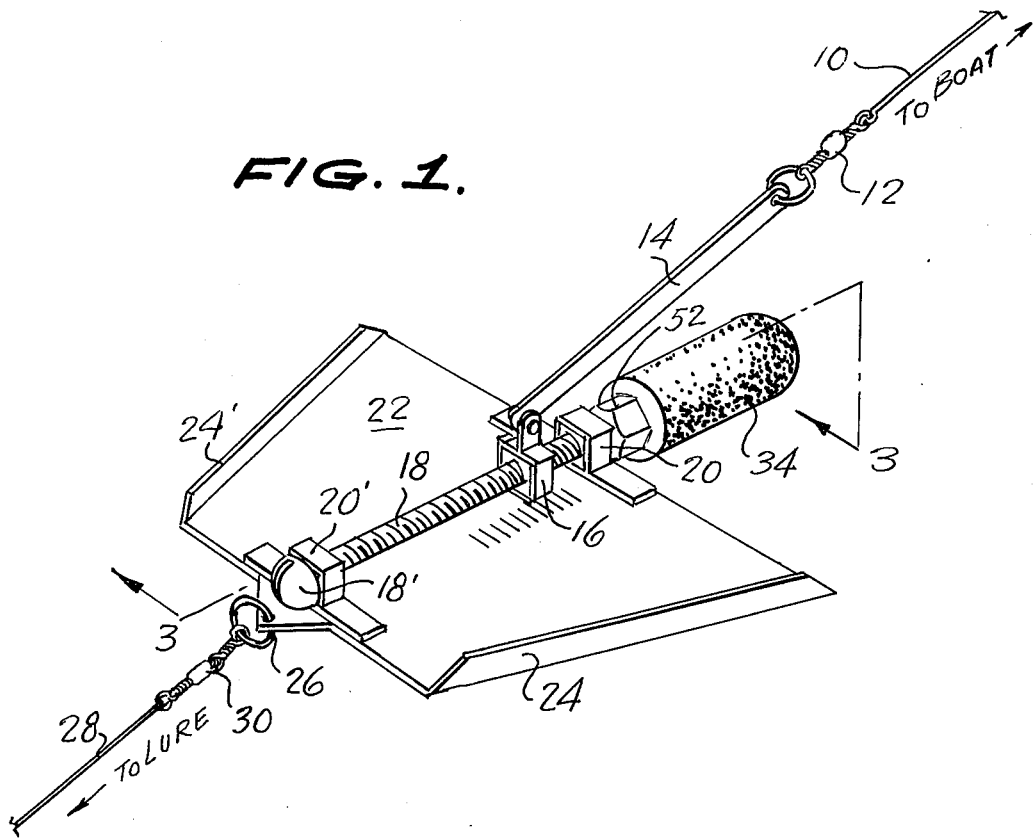
FIG. 1 is a perspective view of the device in use.
Figure 2:
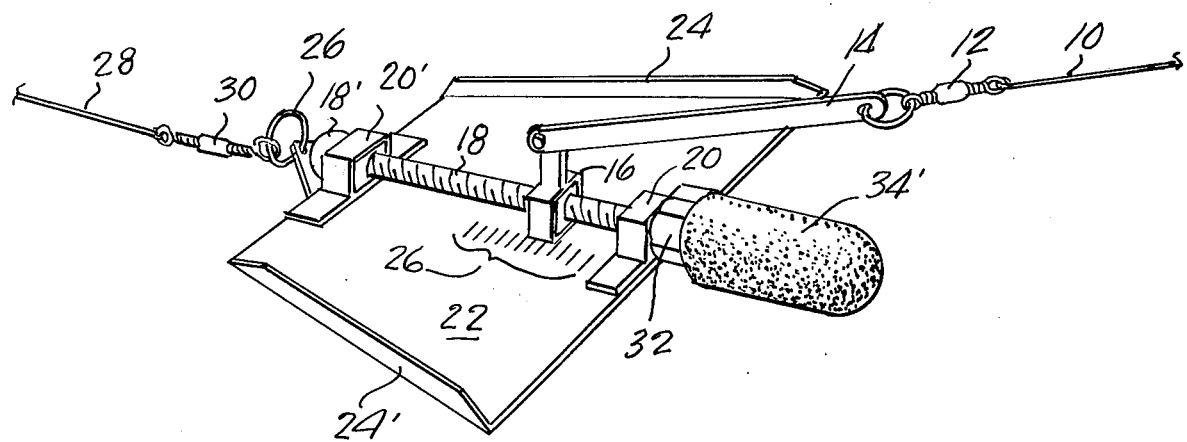
FIG. 2 is a perspective view of the device in use from a different position.

As seen in FIGS. 1 and 2 the device is to be towed by a fishing line 10 secured to a swivel 12 fastened to the bar 14 forming a sort of steering lever to pull the device back to the desired towing direction if it should for any reason try to plane the lure to one side.

A towing bar 14 is secured on a pivot 14' to a nut 16 mounted on a threaded rotatable element 18 which is secured for free rotation in a bushing 20 at the leading edge of the planer plate 22 and bushing 20' at the rear edge of the planer plate 22. The length of the threaded element 18 need not extend the full length of the plane 22 so bushing 20' may be positioned forward of the rear edge.

Planing element 22 may be provided with wing tips 24, 24' to stabilize it. While the shape of the planer is shown as being preferably triangular it is seen that other shapes may be used without departing from the present invention.

At the rear trailing edge of the planer 22 a ring or equivalent, 26 is provided to which leader 28 is to be secured by a swivel 30. The securement of ring 26 to the trailing edge of planer 22 may be by providing an apertured extension or tang if the bushing 20' is at the trailing edge of planer 22, or may be merely by an aperture in planer 22 if the bushing 20' is positioned forward of the trailing edge.

In FIG. 7 an inexpensive forward bushing 20' is shown mounted at the trailing edge of planer 22a and ring 26a is secured by passing through the material of the bushing between the bushing and its mounting on planer 22a.

In FIGS. 1, 2 and 3 it will be noted that threaded element 18 is provided with a head 18' to engage the rearward end of bushing 20' which prevents forward movement of threaded element 18.

Forward of bushing 20 a nut 32 is seen and forward of nut 32 is an internally threaded weight 34. Weight 34 may be removed and replaced by a heavier or by a lighter weight. The weight 34a in FIG. 4 being heavier than weight 34 in FIG. 3. Nut 32 not only prevents threaded element 18 from moving rearwardly but also acts as a lock nut preventing weight 34 from being inadvertantly removed from threaded element 18.

Indicia 36 may be provided on the surface of planer 22 calibrated, perhaps to indicate the desired depth at which the planer will tow under standard conditions, or the indicia may provide reference points by which the user, using many different weights, etc. may by experience use to determine the correct position of nut 16 along threaded element 18.

The operation of the device is explained by reference to FIGS. 5 and 6. In FIG. 5, when the planer is put in the water, weight 34 will cause the leading edge to sink. The forward motion of the boat will cause fishing line 10 to pull the planer 22 to the right. It is seen then that the planer 22 will plane downwardly against the force of the water until the line 10 is inclined steeply and the leader 28 with a lure attached bring the planer to a nearly horizontal position.

When a fish has been hooked on the lure, as seen in FIG. 6, especially if the fish tries to swim downwardly, the planer will be tilted upwardly and, as the fishing line 10 is pulled in the planer will have its leading edge elevated and the force of the water against planer 22 will aid in pulling the fish to the surface.

It will be noted that the material of which any of the parts of the trolling planer is made is of no importance requiring only that the elements have adequate strength characteristics. Non corrosive materials will, of course, be preferred.

What is claimed is:

1. A trolling planer comprising a planer plate having a leading and trailing edge, a rotatable threaded element extending rearwardly from the leading edge of said planer along its center line, non rotatable nut means mounted on said rotatable threaded element to be moved therealong by rotation of said threaded element, a towing bar pivotally secured to said non rotatable nut means, means on said towing bar to receive a fishing line, and means at the trailing edge of said planer plate to receive a leader for a fishing lure.

2. The trolling planer of claim 1 in which said planer plate is provided with stabilizing wings.

3. The trolling planer of claim 1 in which said threaded element extends forwardly of said leading edge, and a removeable weight threadedly engaging said threaded element forwardly of said leading edge.

4. The trolling planer of claim 1 in which said threaded element is mounted for rotation in a bushing at the forward edge, and a bushing at the trailing edge of said planer plate.

5. The trolling planer of claim 1 in which said towing bar is a flat bar pivoted on said nut means on a pivot parallel to the surface of said planer plate.

* * * * *